(12) United States Patent
Okumura

(10) Patent No.: US 10,994,625 B2
(45) Date of Patent: May 4, 2021

(54) ENERGY DISPLAY SYSTEM, DISPLAY DEVICE, AND ENERGY DISPLAY METHOD

(71) Applicant: Mitsubishi Electric Corporation, Tokyo (JP)

(72) Inventor: Akira Okumura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/607,816

(22) PCT Filed: Oct. 15, 2018

(86) PCT No.: PCT/JP2018/038291
§ 371 (c)(1),
(2) Date: Oct. 24, 2019

(87) PCT Pub. No.: WO2020/079725
PCT Pub. Date: Apr. 23, 2020

(65) Prior Publication Data
US 2020/0406771 A1 Dec. 31, 2020

(51) Int. Cl.
*B60L 55/00* (2019.01)
*B60L 53/30* (2019.01)
(Continued)

(52) U.S. Cl.
CPC .............. *B60L 53/305* (2019.02); *B60L 50/64* (2019.02); *B60L 53/18* (2019.02); *B60L 53/51* (2019.02);
(Continued)

(58) Field of Classification Search
CPC ....................................................... B60L 55/00
(Continued)

(56) References Cited

U.S. PATENT DOCUMENTS 7,751,953 B2 * 7/2010 Namaky ................ G07C 5/008
  701/33.2
8,849,687 B2 9/2014 Hakim et al.
(Continued)

FOREIGN PATENT DOCUMENTS

CN 102577022 A 7/2012
CN 107851997 A 3/2018
(Continued)

OTHER PUBLICATIONS

Office Action dated Nov. 2, 2020 in corresponding Chinese Application No. 201880042628.4.

*Primary Examiner* — Adi Amrany
(74) *Attorney, Agent, or Firm* — Birch, Stewart, Kolasch & Birch, LLP.

(57) ABSTRACT

An electric vehicle charging and discharging system according to the present invention includes: a charge and discharge unit capable of charging a battery mounted on an electric vehicle and discharging the battery; a first communication unit that acquires a vehicle identification number of the electric vehicle and a dischargeable capacity value indicating a dischargeable amount of power of the battery from the electric vehicle when the electric vehicle is connected with the charge and discharge unit; and a display unit that displays the vehicle identification number and the dischargeable capacity value acquired by the first communication unit.

8 Claims, 11 Drawing Sheets

(51) Int. Cl.
    *B60L 53/51*     (2019.01)
    *B60L 50/64*     (2019.01)
    *B60L 58/12*     (2019.01)
    *B60L 53/18*     (2019.01)
    *B60L 53/65*     (2019.01)
    *H02J 7/00*     (2006.01)
    *H02J 3/32*     (2006.01)
    *H02J 3/38*     (2006.01)

(52) U.S. Cl.
    CPC ............... *B60L 53/65* (2019.02); *B60L 55/00* (2019.02); *B60L 58/12* (2019.02); *H02J 3/32* (2013.01); *H02J 3/381* (2013.01); *H02J 7/0048* (2020.01); *B60L 2240/54* (2013.01); *H02J 2300/24* (2020.01)

(58) Field of Classification Search
    USPC .......................................................... 307/9.1
    See application file for complete search history.

(56) References Cited

U.S. PATENT DOCUMENTS

| | | | |
|---|---|---|---|
| 8,890,475 B1 * | 11/2014 | Becker | B60L 53/665 320/109 |
| 9,153,966 B2 | 10/2015 | Ishida | |
| 9,340,117 B2 | 5/2016 | Momose et al. | |
| 9,346,365 B1 * | 5/2016 | Penilla | G06Q 50/06 |
| 10,511,171 B2 | 12/2019 | Kudo et al. | |
| 2010/0161482 A1 * | 6/2010 | Littrell | B60L 53/68 705/40 |
| 2011/0074350 A1 * | 3/2011 | Kocher | B60L 53/63 320/109 |
| 2011/0239116 A1 * | 9/2011 | Turner | B60L 53/68 715/705 |
| 2012/0193983 A1 | 8/2012 | Yukizane et al. | |
| 2012/0228933 A1 | 9/2012 | Shiokawa | |
| 2012/0310560 A1 | 12/2012 | Ozaki | |
| 2013/0162221 A1 * | 6/2013 | Jefferies | B60L 53/14 320/155 |
| 2013/0179061 A1 * | 7/2013 | Gadh | B60L 53/63 701/123 |
| 2014/0067660 A1 * | 3/2014 | Cornish | G06Q 20/145 705/39 |
| 2014/0184170 A1 * | 7/2014 | Jeong | B60L 53/63 320/137 |
| 2014/0203077 A1 * | 7/2014 | Gadh | H02J 13/00026 235/382 |
| 2015/0160672 A1 | 6/2015 | Hakim et al. | |
| 2016/0236584 A1 * | 8/2016 | Miftakhov | B60L 53/63 |
| 2016/0257214 A1 * | 9/2016 | Miftakhov | B60L 53/63 |
| 2017/0024552 A1 * | 1/2017 | Rodine | B60L 53/62 |
| 2018/0205230 A1 | 7/2018 | Kudo et al. | |
| 2019/0291589 A1 * | 9/2019 | Erb | G06Q 20/18 |
| 2019/0389315 A1 * | 12/2019 | Zhu | H02J 7/0077 |

FOREIGN PATENT DOCUMENTS

| | | |
|---|---|---|
| JP | 2007-252117 A | 9/2007 |
| JP | 2011-83058 A | 4/2011 |
| JP | 2011-163858 A | 8/2011 |
| JP | 2014-21616 A | 2/2014 |
| WO | WO 2008/141246 A2 | 11/2008 |
| WO | WO 2011/039604 A1 | 4/2011 |
| WO | WO 2011/045925 A1 | 4/2011 |
| WO | WO 2011/077780 A1 | 6/2011 |
| WO | WO 2011/096441 A1 | 8/2011 |
| WO | WO 2012/017937 A1 | 2/2012 |

* cited by examiner

ENERGY DISPLAY SYSTEM, DISPLAY DEVICE, AND ENERGY DISPLAY METHOD

FIELD

The present invention relates to an energy display system, a display device, and an energy display method for displaying energy relating to an electric vehicle.

BACKGROUND

In recent years, with increasing use of electric vehicles such as electric vehicles (EVs) and plug-in hybrid electric vehicles (PHEVs), home power converters for charging batteries for driving mounted on electric vehicles have been increasingly used. Furthermore, vehicle-to-home (V2H) systems typified by an electric vehicle charger and discharger for using power stored in a battery for driving mounted on an electric vehicle for household loads have also been increasingly used. Hereinafter, charging and discharging of a battery for driving mounted on an electric vehicle will also be referred to as charging and discharging of the electric vehicle.

In addition, with increasing use of home energy management systems (HEMSs), it is getting possible to monitor home energy usage by a special remote controller or a display device, such as a smart phone or a tablet, of a user. Patent Literature 1 teaches an energy display system capable of displaying power consumption of household loads and power consumption of charging an electric vehicle on each of grid power and generated power.

CITATION LIST

Patent Literature

Patent Literature 1: Japanese Patent Application Laid-open No. 2011-163858

SUMMARY

Technical Problem

According to the technology taught in Patent Literature 1, the flow of home energy can be monitored. An electric vehicle, however, may also be charged and discharged at a place other than home. In such a case, management of the flow of home energy alone as the technology taught in Patent Literature 1 cannot present information relating to energy usage of a battery of each electric vehicle, such as how much the dischargeable capacity, which is the currently remaining power amount stored in the battery of the electric vehicle, to the user.

The present invention have been made in view of the above, and an object thereof is to provide an energy display system capable of presenting information on energy usage of a battery of each electric vehicle to a user.

Solution to Problem

To solve the aforementioned problems and achieve the object, an energy display system according to the present invention includes: a charge and discharge unit capable of charging a battery mounted on an electric vehicle and discharging the battery; and an acquisition unit that acquires a vehicle identification number of the electric vehicle and a dischargeable capacity value from the electric vehicle when the electric vehicle is connected with the charge and discharge unit, the dischargeable capacity value indicating a dischargeable amount of power of the battery. The energy display system also includes a display unit that displays the vehicle identification number and the dischargeable capacity value acquired by the acquisition unit.

Advantageous Effects of Invention

An energy display system according to the present invention produces an effect of presenting information on dischargeable capacity of a battery of each electric vehicle to a user.

DESCRIPTION OF EMBODIMENTS

An energy display system, a display device, and an energy display method according to embodiments of the present invention will be described in detail below with reference to the drawings. Note that the present invention is not limited to the embodiments.

First Embodiment

Figure 1:
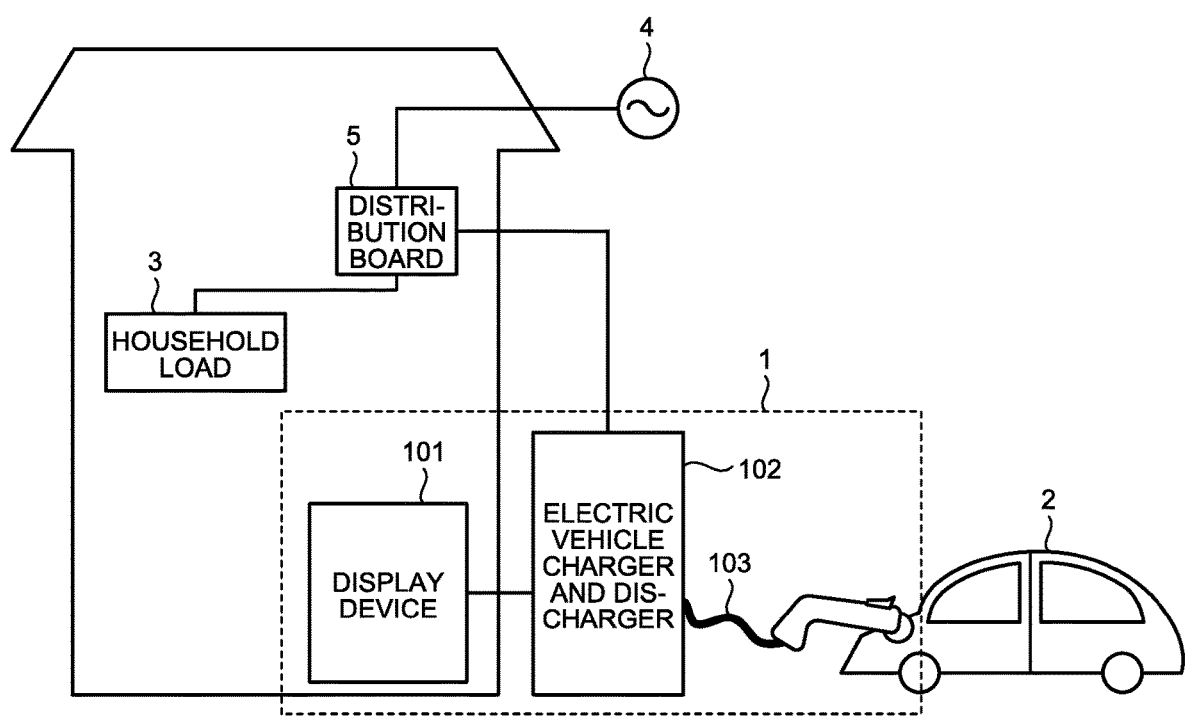
FIG. 1 is a diagram illustrating an example of a configuration of an electric vehicle charging and discharging system according to the first embodiment.

FIG. 1 is a diagram illustrating an example of a configuration of an electric vehicle charging and discharging system according to a first embodiment of the present invention. The electric vehicle charging and discharging system 1 is an example of an energy display system according to the present invention. As illustrated in FIG. 1, the electric vehicle charging and discharging system 1 includes a display device 101, an electric vehicle charger and discharger 102, and a charge and discharge cable 103. The electric vehicle charging and discharging system 1 is connectable with each of an electric vehicle 2 and a distribution board 5. The electric vehicle charging and discharging system 1 is capable of charging and discharging the electric vehicle 2.

The distribution board 5 is connected with each of a household load 3 and a grid power supply 4. Power supplied from the grid power supply 4 is supplied to the household load 3 via the distribution board 5. The household load 3 is a load such as an electrical appliance installed in a house of an owner of the electric vehicle 2.

The electric vehicle charger and discharger 102, which is a charger and discharger, is connected with the distribution board 5, the display device 101, and the charge and discharge cable 103. The electric vehicle charger and discharger 102 is capable of converting alternating-current (AC) power supplied from the grid power supply 4 via the distribution board 5 into direct-current (DC) power, and supplying the DC power to a battery for driving (hereinafter simply referred to as a battery), which is mounted on the electric vehicle 2, via the charge and discharge cable 103 to charge the electric vehicle 2. In addition, the electric vehicle charger and discharger 102 is capable of receiving DC power obtained by discharging the battery mounted on the electric vehicle 2 via the charge and discharge cable 103, converting the received DC power into AC power, and supplying the AC power to the household load 3 via the distribution board 5 to discharge the electric vehicle 2.

Herein, the electric vehicle 2 and the electric vehicle charger and discharger 102 are assumed to be compliant with a standard such as CHAdeMO (registered trademark), which is an agreement for fast charging of electric vehicles. Thus, when the electric vehicle 2 and the electric vehicle charger and discharger 102 are connected with each other via the charge and discharge cable 103, operation in accordance with the standard is carried out. The electric vehicle 2 is charged and discharged by the operation in accordance with the standard. Hereinafter, assume, in the operation in accordance with the standard, that the electric vehicle charger and discharger 102 is capable of receiving, from the electric vehicle 2, information including a vehicle identification number of the electric vehicle 2, a value indicating a maximum capacity to which the battery can be charged (hereinafter referred to as a maximum capacity value), a value indicating a remaining capacity that can be currently discharged (hereinafter referred to as a dischargeable capacity value), and the like. The maximum capacity value is a value indicating the maximum capacity that is defined by the specification or the like of the battery, and the dischargeable capacity value is a value indicating the amount of power currently stored in the battery. Alternatively, instead of the amount of power currently stored in the battery, the dischargeable capacity value may be a value obtained by subtracting a certain power amount from the amount of power currently stored in the battery.

The display device 101 is capable of displaying information received from the electric vehicle charger and discharger 102. The display device 101 may be a terminal specially provided for the electric vehicle charging and discharging system 1, or a general-purpose terminal such as a smart phone or a tablet of a user. The display device 101 and the electric vehicle charger and discharger 102 are connected in such a manner that the display device 101 and the electric vehicle charger and discharger 102 can communicate with each other. A line connecting the display device 101 with the electric vehicle charger and discharger 102 may be a wired circuit or a wireless circuit.

Figure 2:
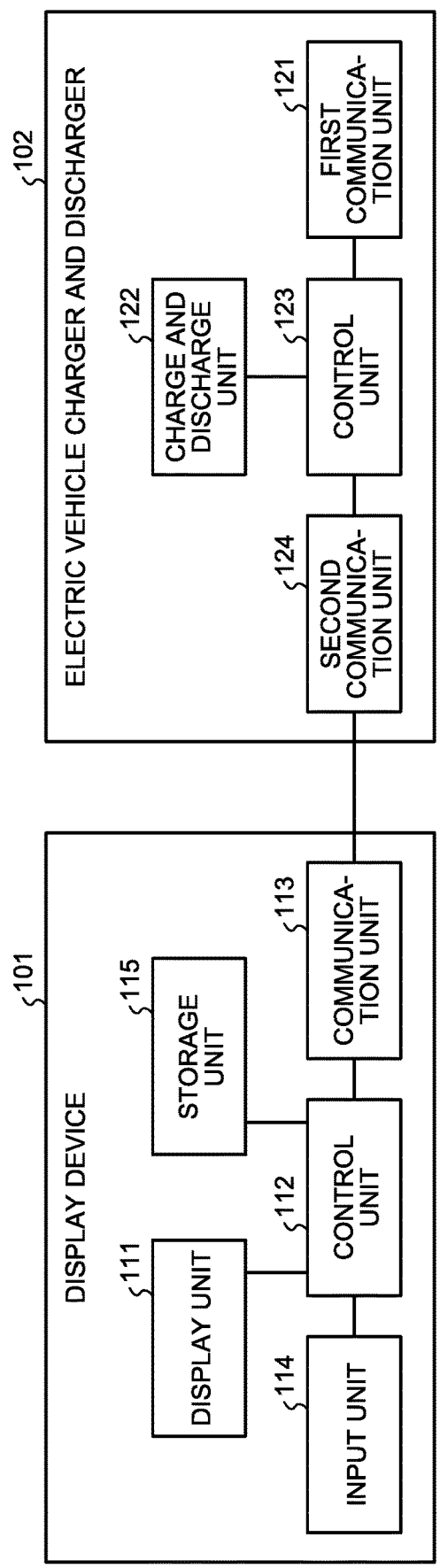
FIG. 2 is a diagram illustrating an example of configurations of a display device and an electric vehicle charger and discharger according to the first embodiment.

FIG. 2 is a diagram illustrating an example of configurations of the display device 101 and the electric vehicle charger and discharger 102 of the present embodiment. As illustrated in FIG. 2, the display device 101 includes a display unit 111, a control unit 112, a communication unit 113, an input unit 114, and a storage unit 115. The display unit 111 is a display, a liquid crystal monitor, or the like that displays screens. The control unit 112 is a processing circuit that controls operation of the display device 101. The communication unit 113 is a communication circuit that communicates with the electric vehicle charger and discharger 102. The input unit 114 is a keyboard, a button, a mouse, or the like that receives an operation from a user, converts the received operation into information, and transfers the information to the control unit 112. The storage unit 115 is a memory that is capable of storing information for display on the display unit 111. Alternatively, the display unit 111 and the input unit 114 may be integrated as a touch panel.

As illustrated in FIG. 2, the electric vehicle charger and discharger 102 includes a first communication unit 121, a charge and discharge unit 122, a control unit 123, and a second communication unit 124. The first communication unit 121 communicates with the electric vehicle 2. The charge and discharge cable 103 includes a power line for transmission of power and a signal line for transmission of signals, and the first communication unit 121 communicates with the electric vehicle 2 via the signal line of the charge and discharge cable 103. The charge and discharge unit 122 is connected with the electric vehicle 2 by the power line of the charge and discharge cable 103, and the first communication unit 121 is connected with the electric vehicle 2 by the signal line of the charge and discharge cable 103. The first communication unit 121 is an acquisition unit that acquires the vehicle identification number of the electric vehicle and the dischargeable capacity value, which indicates the amount of power that can be discharged from the battery, from the electric vehicle 2 while the electric vehicle 2 is connected with the charge and discharge unit 122 via the charge and discharge cable 103. The charge and discharge unit 122 is capable of charging and discharging the battery mounted on the electric vehicle 2. The charge and discharge cable 103 is connected with the charge and discharge unit 122, and the electric vehicle 2 and the charge and discharge unit 122 can be connected with each other via the charge and discharge cable 103. Specifically, the charge and discharge unit 122 is a power conversion circuit that, for charging the electric vehicle 2, converts AC power supplied from the grid power supply 4 via the distribution board 5 into DC power and supplies the DC power to the electric vehicle 2 via the charge and discharge cable 103 under the control of the control unit 123. In addition, for discharging the electric vehicle 2, the charge and discharge unit 122 converts DC power supplied from the electric vehicle 2 via the charge and discharge cable 103 into AC power, and supplies the AC power to the household load 3 via the distribution board 5.

The control unit 123 generates data to be transmitted to the electric vehicle 2 in accordance with the aforementioned standard such as CHAdeMO (registered trademark) and outputs the data to the first communication unit 121. The control unit 123 also performs control of the charge and discharge in accordance with the standard on the basis of the data received from the electric vehicle 2 via the first communication unit 121. As will be described later, when the electric vehicle 2 is connected to the charge and discharge cable 103, the first communication unit 121 acquires the vehicle identification number and the dischargeable capacity value from the electric vehicle 2. Note that the operations for charging and discharging the electric vehicle 2 may be similar to typical operations, and detailed explanation thereof will thus be omitted. The control unit 123 also transmits information to be displayed on the display device 101 to the display device 101 via the second communication unit 124. The second communication unit 124 communicates with the display device 101.

As described above, the electric vehicle charging and discharging system 1 includes the charge and discharge unit 122, and the first communication unit 121 that acquires the vehicle identification number and the dischargeable capacity value from the electric vehicle 2 while the electric vehicle is connected with the charge and discharge unit 122 via the charge and discharge cable 103. The electric vehicle charging and discharging system 1 also includes the display unit 111 that displays the vehicle identification number and the dischargeable capacity value acquired by the first communication unit 121.

While an example in which the display device 101 and the electric vehicle charger and discharger 102 are separately provided is presented in the example illustrated in FIG. 1, the electric vehicle charger and discharger 102 may alternatively have a display function. For example, the electric vehicle charger and discharger 102 may include the display unit 111, the input unit 114, and the storage unit 115, and the control unit 112 may control screen display on the display unit 111.

Figure 3:
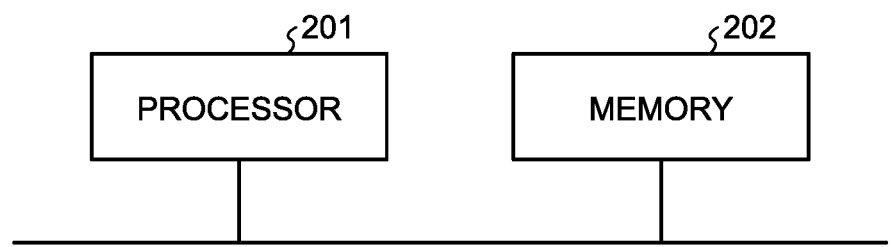
FIG. 3 is a diagram illustrating an example of a configuration of a control circuit including a processor according to the first embodiment.

Next, a hardware configuration of the control unit 112 and the control unit 123 illustrated in FIG. 2 will be described. The control unit 112 and the control unit 123 are each implemented by a processing circuit. The processing circuit may be a dedicated circuit, or a control circuit that includes a processor. FIG. 3 is a diagram illustrating an example of a configuration of a control circuit including a processor. The control circuit illustrated in FIG. 3 includes a processor 201 and a memory 202. In a case where the control unit 112 is implemented by the control circuit illustrated in FIG. 3, the control unit 112 is implemented by the processor 201 executing programs for implementing the control unit 112 stored in the memory 202. In a similar manner, in a case where the control unit 123 is implemented by the control circuit illustrated in FIG. 3, the control unit 123 is implemented by the processor 201 executing programs for implementing the control unit 123 stored in the memory 202.

Next, operation in the present embodiment will be explained. In the present embodiment, as described above, the electric vehicle charger and discharger 102 receives the vehicle identification number of the electric vehicle 2, and the maximum capacity value and the current dischargeable capacity value of the battery. Specifically, the control unit 123 receives the vehicle identification number of the electric vehicle 2, and the maximum capacity value and the current dischargeable capacity value of the battery via the first communication unit 121. The control unit 123 transmits the received information to the display device 101 via the second communication unit 124.

Upon receiving the vehicle identification number of the electric vehicle 2 and the maximum capacity value and the current dischargeable capacity value of the battery via the communication unit 113, the control unit 112 of the display device 101 stores the received information in the storage unit 115. The control unit 112 also generates image data for screen display of the vehicle identification number of the electric vehicle 2 and the maximum capacity value and the current dischargeable capacity value of the battery, stores the image data in the storage unit 115 and displays the image data on the display unit 111. As a result, the display unit 111 display a screen including the vehicle identification number of the electric vehicle 2 and the maximum capacity value and the current dischargeable capacity value of the battery. Information and images other than the information received from the electric vehicle charger and discharger 102 may be displayed on this screen. For example, information input from a user via the input unit 114 of the display device 101, a predetermined image, or the like may be included in the screen.

Figure 4:
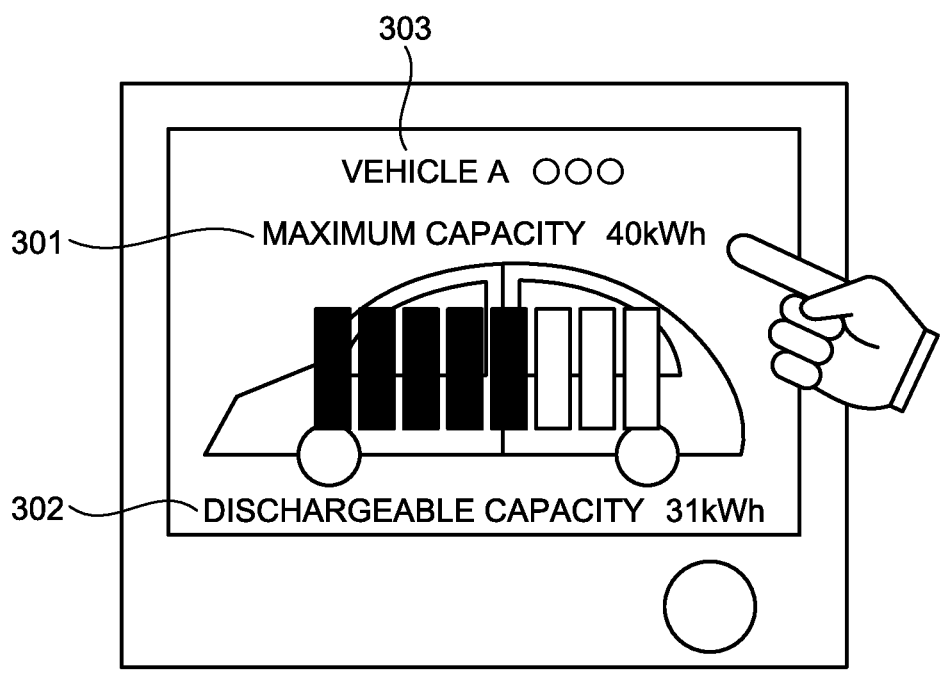
FIG. 4 is a diagram illustrating an example of a screen displayed by a display unit according to the first embodiment.

FIG. 4 is a diagram illustrating an example of a screen displayed on the display unit 111. The screen illustrated in FIG. 4 includes an area 301 in which the maximum capacity value of the battery of the electric vehicle 2 is displayed, an area 302 in which the dischargeable capacity value of the battery of the electric vehicle 2 is displayed, and an area 303 in which the vehicle identification number of the electric vehicle 2 is displayed. The maximum capacity value is displayed on the right of a text "MAXIMUM CAPACITY" in the area 301, and the dischargeable capacity value is displayed on the right of a text "DISCHARGEABLE CAPACITY) in the area 302.

In the example illustrated in FIG. 4, VEHICLE A, which is the vehicle name used in the display device 101, is also displayed in the area 303 in addition to the vehicle identification number of the electric vehicle 2. For example, the control unit 112 of the display device 101 assigns a different vehicle name each time a new vehicle identification number is received from the electric vehicle charger and discharger 102. In a case where the user of the electric vehicle charging and discharging system 1 has a plurality of electric vehicles 2, a vehicle name is assigned to each of the electric vehicles 2 depending on the vehicle identification number. For example, the control unit 112 assigns VEHICLE A to the vehicle name of the vehicle identification number that is received first, and upon receiving a vehicle identification number different from that of the VEHICLE A from the electric vehicle charger and discharger 102, assigns VEHICLE B to the vehicle name of the received vehicle identification number. Alternatively, upon receiving a new vehicle identification number, the control unit 112 may display a screen prompting to input a vehicle name on the display unit 111 so as to receive an input of a vehicle name from a user through the input unit 114. In this case, an input of identification information of the user, such as the name of the user, for example, may also be received, and the name of the user may also be displayed in the area 303. Note that the vehicle name need not be displayed in the area 303, and only the vehicle identification number may be displayed in the area 303.

In addition, in the example illustrated in FIG. 4, an image representing the vehicle and an image indicating the ratio of the dischargeable capacity value to the maximum capacity value of the battery are included on the screen in addition to the area 301, the area 302, and the area 303 described above. In this manner, an image for facilitating the user to visually recognize the dischargeable capacity value, and the like may be displayed on the screen displayed by the display unit 111. The screen illustrated in FIG. 4 is an example, and it is sufficient that the display unit 111 display only the dischargeable capacity value of the battery, or the maximum capacity value and the dischargeable capacity value of the battery as energy usage of the electric vehicle 2. In addition, the display device 101 may be configured to change the type of a screen displayed on the display unit 111 in response to an input from a user using the input unit 114. For example, the screen may be switched between a first screen displaying the dischargeable capacity value only in a numerical value and a second screen also displaying an image together with the maximum capacity value and the dischargeable capacity value as illustrated in FIG. 4. In addition, the display device 101 may receive a selection of a vehicle name from a user, and display the first screen or the second screen associated with the selected vehicle name. In addition, information displayed on the display unit 111 may be changed in response to an input from a user using the input unit 114.

As described above, the electric vehicle charging and discharging system 1 according to the present embodiment receives the vehicle identification number, the maximum capacity value and the current dischargeable capacity value of the battery from the electric vehicle 2, and displays the received information. A system that only manages home energy exchange cannot present information on each individual electric vehicle 2 including the maximum capacity and the dischargeable capacity of the battery of the electric vehicle 2, and the like to a user. In contrast, according to the present embodiment, the current dischargeable capacity value is acquired from the electric vehicle 2, which enables information including the maximum capacity and the dischargeable capacity of the battery of the electric vehicle 2, and the like to be presented to a user for each electric vehicle 2. In particular, even in a household including a plurality of electric vehicles 2, information on the maximum capacity and the dischargeable capacity of a battery of each of the electric vehicles 2, and the like can be presented to a user.

Second Embodiment

Figure 5:
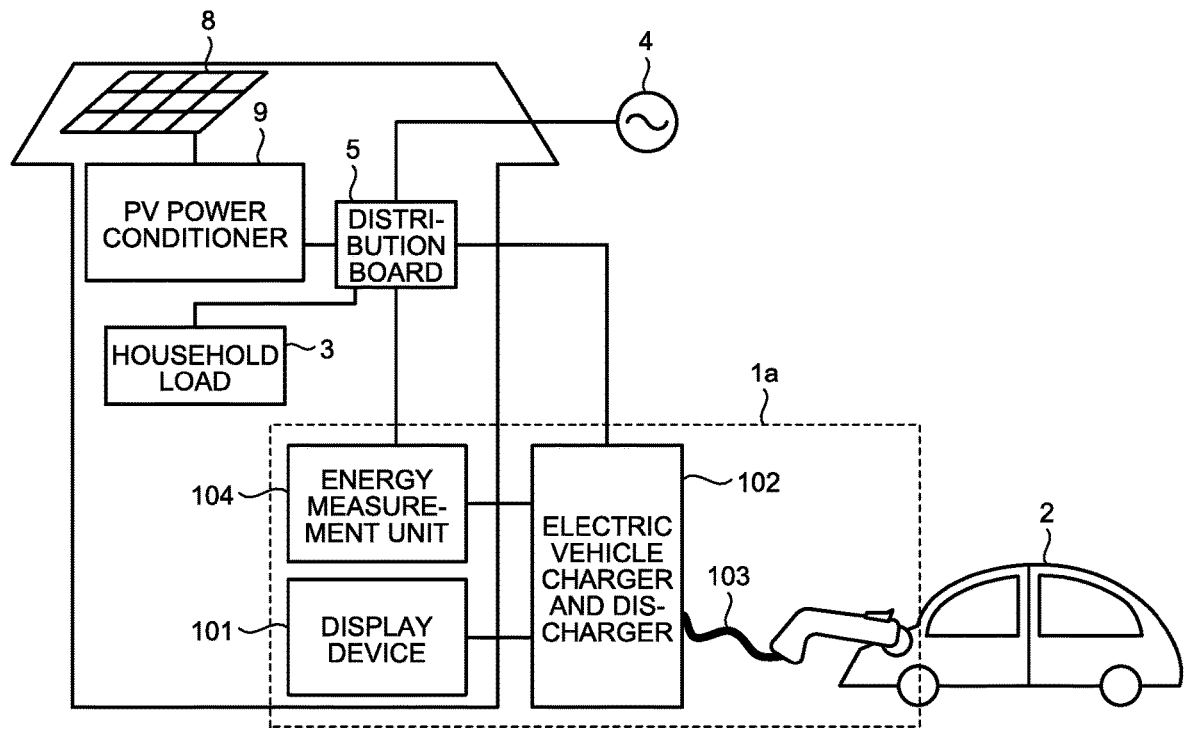
FIG. 5 is a diagram illustrating an example of a configuration of an electric vehicle charging and discharging system according to a second embodiment.

FIG. 5 is a diagram illustrating an example of a configuration of an electric vehicle charging and discharging system according to a second embodiment of the present invention. The electric vehicle charging and discharging system 1*a* illustrated in FIG. 5 is an example of an energy display system according to the present invention. As illustrated in FIG. 5, the electric vehicle charging and discharging system 1*a* includes a display device 101, an electric vehicle charger and discharger 102, a charge and discharge cable 103, and an energy measurement unit 104. The charge and discharge cable 103 is similar to that in the first embodiment. The operations of the display device 101 and the electric vehicle charger and discharger 102 are partially different from those in the first embodiment, but the configurations of the display device 101 and the electric vehicle charger and discharger 102 are similar to those in the first embodiment, and the description of the configurations of the display device 101 and the electric vehicle charger and discharger 102 will thus not be repeated. Differences from the first embodiment will be mainly described below.

In the present embodiment, the electric vehicle charging and discharging system 1*a*, a household load 3, and a photovoltaics (PV) power conditioner 9 are connected with the distribution board 5. The PV power conditioner 9 converts DC power generated by a solar photovoltaic panel 8 into AC power, and outputs the AC power to the distribution board 5. Thus, power generated by the solar photovoltaic panel 8 can be supplied to the household load 3 via the distribution board 5 or caused to reversely flow to the grid.

The energy measurement unit 104 of the electric vehicle charging and discharging system 1*a* is capable of measuring a generated power amount, which is the amount of power generated by a photovoltaic power generation system, that is, the amount of power output from the PV power conditioner 9, the power consumption of the household load 3, which is the amount of power consumed by the household load 3, and the amount of power used for charging the electric vehicle 2 by the electric vehicle charger and discharger 102. The energy measurement unit 104 is also capable of measuring a purchased power amount, which is the amount of power supplied from the grid power supply 4 to home, that is, the household load 3 and the electric vehicle charger and discharger 102. The energy measurement unit 104 is capable of separately measuring the amount of power supplied from the grid power supply 4 and used for charging the electric vehicle 2 and the amount of power supplied from the PV power conditioner 9 and used for charging the electric vehicle 2, as the amount of power used for charging the electric vehicle 2 by the electric vehicle charger and discharger 102. Furthermore, the energy measurement unit 104 is capable of measuring sold and purchased power amounts, which are the amount of power supplied from the electric vehicle charger and discharger 102 to the household load 3 via the distribution board 5 owing to discharge of the electric vehicle 2, and the amount of power caused to reversely flow from the PV power conditioner 9 to the grid power supply 4. As described above, the energy measurement unit 104 measures the power amount of each power path, and transmits the measured power amounts to the electric vehicle charger and discharger 102. The control unit 123 of the electric vehicle charger and discharger 102 transmits the power amounts received from the energy measurement unit 104 via the second communication unit 124 to the display device 101 via the second communication unit 124.

Note that the sold power amount is assumed to be a power amount obtained by subtracting the amount of power consumed at home from the generated power amount. When neither of charging and discharging of the electric vehicle 2 is performed by the electric vehicle charger and discharger 102, the amount of power consumed at home is the power consumption of the household load 3. When charging of the electric vehicle 2 is performed by the electric vehicle charger and discharger 102, the amount of power consumed at home is a sum of the power consumption of the household load 3 and the amount of power used by the electric vehicle charger and discharger 102. When discharging of the electric vehicle 2 is performed by the electric vehicle charger and discharger 102, the amount of power consumed at home is a value obtained by subtracting the amount of power supplied to the household load 3 by the electric vehicle charger and discharger 102 from the power consumption of the household load 3.

Measurement by an analog sensor, measurement using communication with the distribution board 5, and the like can be considered as the method by which the energy measurement unit 104 measures the amounts of power flow, any method may be used for the measurement method of the energy measurement unit 104 in the present embodiment.

Figure 6:
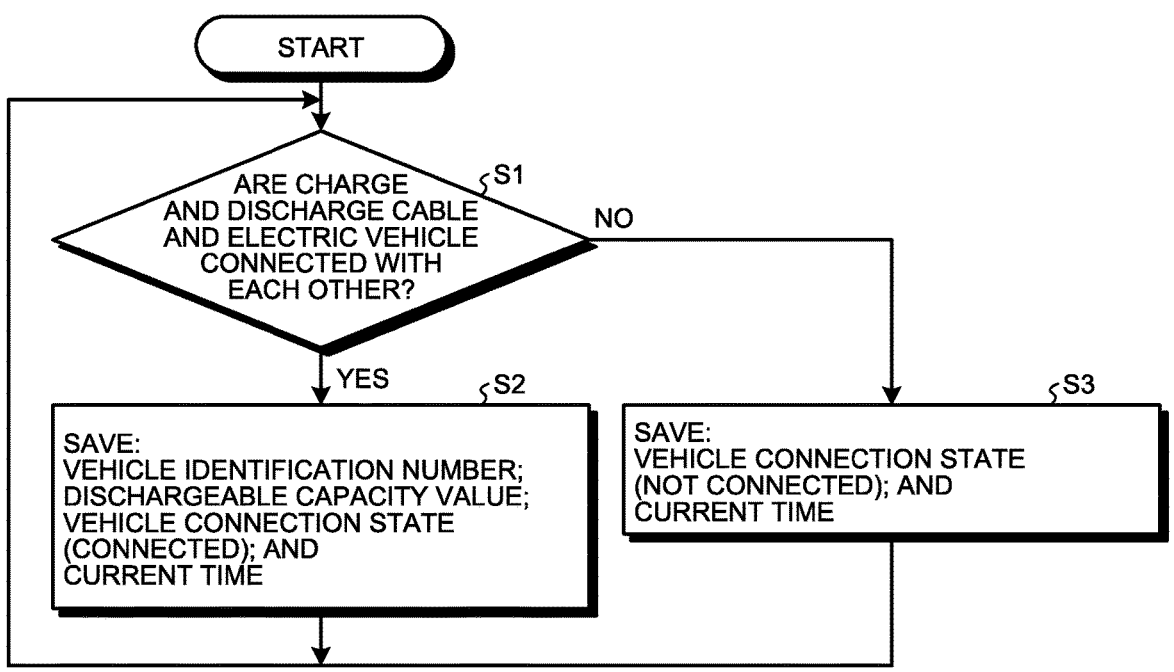
FIG. 6 is a flowchart illustrating an example of a process of storing a dischargeable capacity value in an electric vehicle charging and discharging system according to the second embodiment.

Next, operation in the present embodiment will be explained. FIG. 6 is a flowchart illustrating an example of a process of storing the dischargeable capacity value in the electric vehicle charging and discharging system 1*a* according to the present embodiment. The electric vehicle charging and discharging system 1*a* of the present embodiment stores the dischargeable capacity value acquired from the electric vehicle 2 through the procedures illustrated in FIG. 6. As illustrated in FIG. 6, the electric vehicle charging and discharging system 1a first determines whether the charge and discharge cable 103 and the electric vehicle 2 are connected with each other (step S1). Assume here that the charge and discharge cable 103 is connected with the electric vehicle charger and discharger 102. Thus, when the electric vehicle 2 is connected with the charge and discharge cable 103, the electric vehicle 2 and the electric vehicle charger and discharger 102 are connected with each other via the charge and discharge cable 103. Specifically, in step S1, the electric vehicle charger and discharger 102 can determine whether or not the charge and discharge cable 103 and the electric vehicle 2 are connected with each other through procedures in accordance with the aforementioned standard, for example.

When the charge and discharge cable 103 and the electric vehicle 2 are determined to be connected with each other (step S1: Yes), the electric vehicle charging and discharging system 1a saves the vehicle identification number, the dischargeable capacity value, the vehicle connection state, and the current time (step S2). Alternatively, the maximum capacity value mentioned in the first embodiment may also be saved with the dischargeable capacity value. The maximum capacity value, however, does not change, and thus, only needs to be saved in association with the vehicle identification number and need not be updated every time. Since the vehicle connection state saved in step S2 is information indicating that the charge and discharge cable 103 and the electric vehicle 2 are connected with each other, the vehicle connection state in FIG. 6 is described as "VEHICLE CONNECTION STATE (CONNECTED)". Specifically, in step S2, the control unit 123 of the electric vehicle charger and discharger 102 receives the vehicle identification number and the dischargeable capacity value from the electric vehicle 2 via the first communication unit 121, and transmits the received information and the vehicle connection state to the display device 101 via the second communication unit 124. As described above, the vehicle connection state at this point is a value indicating the charge and discharge cable 103 and the electric vehicle 2 are connected with each other. The control unit 112 of the display device 101 receives the vehicle identification number, the dischargeable capacity value, and the vehicle connection state from the electric vehicle charger and discharger 102 via the communication unit 113, and stores the received information and the current time in the storage unit 115. For example, a database for registering the current time, the dischargeable capacity value, and the vehicle connection state is provided for each vehicle identification number in the storage unit 115, and the control unit 112 registers the vehicle identification numbers, the current times, the dischargeable capacity values, and the vehicle connection states in the database. Hereinafter, an example in which the database is provided in the storage unit 115 will be explained. In a case where a plurality of vehicle identification numbers are registered in the database, for each of vehicle identification numbers other than the vehicle identification number associated with the electric vehicle 2 that is currently connected, information indicating not connected is registered as the vehicle connection state and information indicating unknown is registered as the dischargeable capacity value.

When the charge and discharge cable 103 and the electric vehicle 2 are determined not to be connected (step S1: No), the electric vehicle charging and discharging system 1a saves the vehicle connection state, and the current time (step S3). Since the vehicle connection state saved in step S3 is information indicating that the charge and discharge cable 103 and the electric vehicle 2 are not connected with each other, the vehicle connection state in FIG. 6 is described as "VEHICLE CONNECTION STATE (NOT CONNECTED)". Specifically, in step S3, the control unit 123 of the electric vehicle charger and discharger 102 transmits information indicating the non-connected state as the vehicle connection state to the display device 101 via the second communication unit 124. The control unit 112 of the display device 101 receives the vehicle connection state from the electric vehicle charger and discharger 102 via the communication unit 113, and stores the received information and the current time in the storage unit 115. In this case, since the electric vehicle 2 is not connected with the electric vehicle charger and discharger 102, the vehicle connection state of not being connected is associated with all the vehicle identification numbers stored in the storage unit 115. Thus, the control unit 112 stores, storage unit 115, the current time and the vehicle connection state in association with all the vehicle identification numbers stored in the storage unit 115. For example, the control unit 112 registers the current time, the vehicle connection state, and the dischargeable capacity value for all the vehicle identification numbers in the aforementioned database. Information indicating unknown is registered as the dischargeable capacity value in this case.

When a predetermined time from previous step S1 elapses after step S2 or step S3, the process from step S1 is performed again. In other words, step S1 is periodically performed, and step S2 or step S3 is performed thereafter.

As a result of the process performed as described above, the vehicle connection state at every predetermined time is stored for each vehicle identification number in the storage unit 115, and, at time when the charge and discharge cable 103 and the electric vehicle 2 is connected with each other, the dischargeable capacity value is also stored. As described above, in the case where the database is used, for a vehicle identification number X, for example such information as follows is stored:

vehicle identification number X:

time k: vehicle connection state (connected): dischargeable capacity value ($B_1$)

time k+1: vehicle connection state (connected): dischargeable capacity value ($B_2$)

time k+2: vehicle connection state (not connected): dischargeable capacity value (unknown) . . . .

Such information is stored in the database for each vehicle identification number.

In addition, upon receiving the power amounts measured by the energy measurement unit 104 from the electric vehicle charger and discharger 102 via the communication unit 113, the control unit 112 of the display device 101 stores the power amounts together with the current time in the storage unit 115. As a result, the power amounts measured by the energy measurement unit 104, that is, the generated power amount, the power consumption of the household load 3, and the amount of power used for charging the electric vehicle 2 by the electric vehicle charger and discharger 102, the amount of power supplied to the household load 3 owing to discharge of the electric vehicle 2, and the sold and purchased power amounts are stored in the storage unit 115 at every time.

Figure 7:
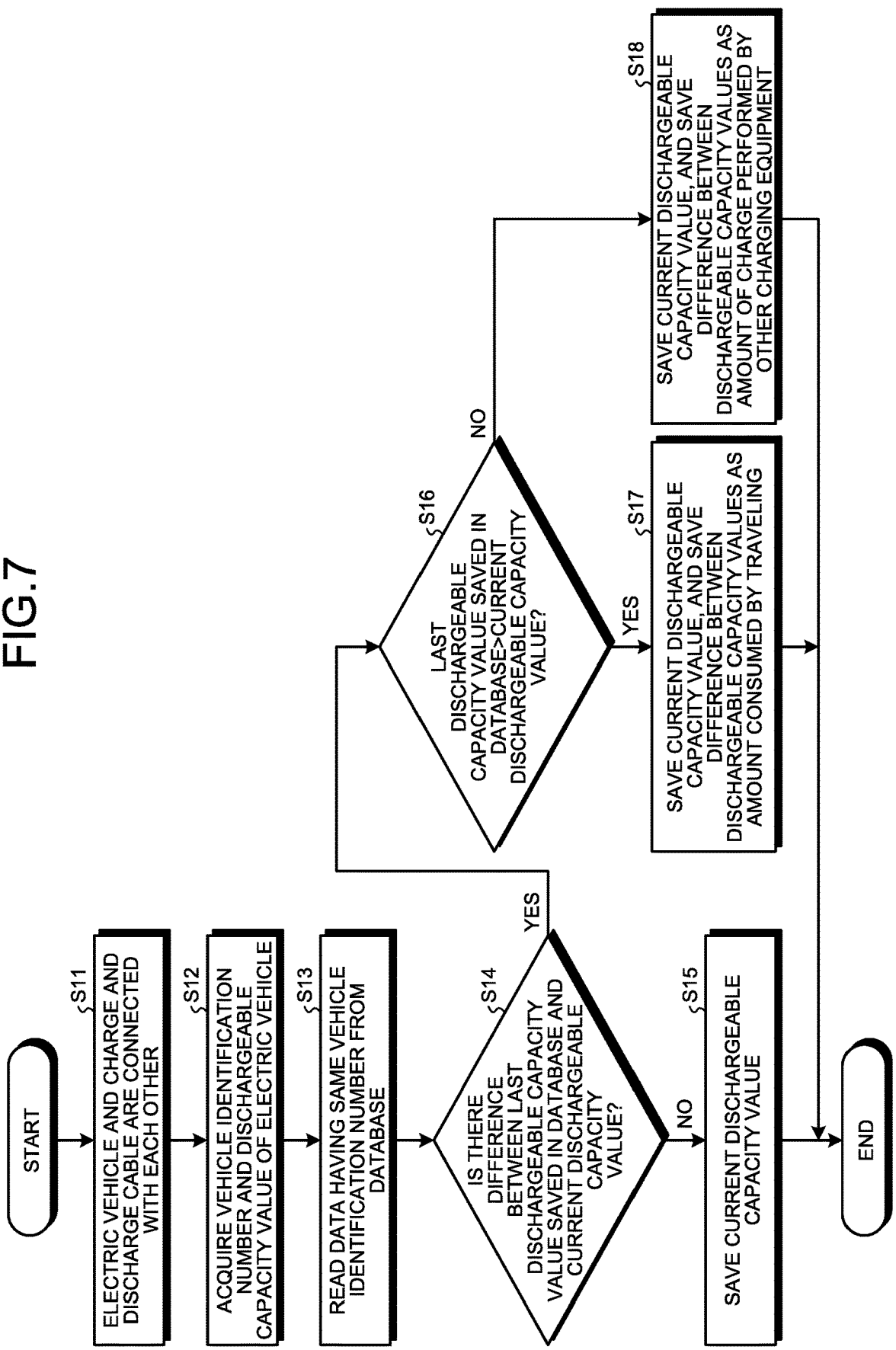
FIG. 7 is a flowchart illustrating an example of procedures of a data generating process for energy display in the electric vehicle charging and discharging system according to the second embodiment.

The electric vehicle charging and discharging system 1a of the present embodiment performs a data generating process for energy display by using the information stored through the process of storing the dischargeable capacity value illustrated in FIG. 6. FIG. 7 is a flowchart illustrating an example of procedures of the data generating process for energy display in the electric vehicle charging and discharging system 1a according to the present embodiment. The process illustrated in FIG. 7 is performed when the electric vehicle 2 that was connected with the electric vehicle charger and discharger 102 via the charge and discharge cable 103 is once disconnected and is then connected again with the electric vehicle charger and discharger 102 via the charge and discharge cable 103. As illustrated in FIG. 7, when the charge and discharge cable 103 and the electric vehicle 2 are determined to be connected with each other (step S11), the electric vehicle charging and discharging system 1a acquires the vehicle identification number and the dischargeable capacity value (step S12). Specifically, in step S12, the control unit 123 of the electric vehicle charger and discharger 102 receives the vehicle identification number and the dischargeable capacity value from the electric vehicle 2 via the first communication unit 121, and transmits the received information and the vehicle connection state to the display device 101 via the second communication unit 124. In this manner, the display device 101 can acquire the vehicle identification number and the dischargeable capacity value.

Subsequently, the control unit 112 of the display device 101 reads, from the database of the storage unit 115, data having the same vehicle identification number as that acquired in step S12 (step S13). Specifically, the control unit 112 extracts, from the database of the storage unit 115, data with the same vehicle identification number as that acquired in step S2 step S12. Subsequently, the control unit 112 determines whether there is any difference between the last dischargeable capacity value saved in the database and the current dischargeable capacity value (step S14). Specifically, the control unit 112 obtains the last time from times at which the dischargeable capacity value is not unknown from the data extracted in step S13. The control unit 112 then sets the dischargeable capacity value associated with the obtained last time as the last dischargeable capacity value, obtains an absolute value of the difference between the last dischargeable capacity value and the current dischargeable capacity value, and determines whether or not the absolute value of the difference is equal to or smaller than a threshold. The current dischargeable capacity value in this case is the dischargeable capacity value received in step S12. The threshold is used for determining whether the last dischargeable capacity value and the current dischargeable capacity value are substantially the same, and may be 0 or may be set to a value as small as the resolution of the measurement of the dischargeable capacity value, for example.

When it is determined that there is no difference between the last dischargeable capacity value saved in the database and the current dischargeable capacity value (step S14: No), the display device 101 saves the current dischargeable capacity value (step S15), and terminates the process. Specifically, in step S15, the control unit 112 registers the current time and the vehicle connection state in the database in addition to the current dischargeable capacity value in a manner similar to step S2.

When it is determined that there is a difference between the last dischargeable capacity value saved in the database and the current dischargeable capacity value (step S14: Yes), the control unit 112 of the display device 101 determines whether the last dischargeable capacity value saved in the database is larger than the current dischargeable capacity value (step S16). When the last dischargeable capacity value is larger than the current dischargeable capacity value, it can be presumed that the battery of the electric vehicle 2 is discharged by traveling of the electric vehicle 2, and when the last dischargeable capacity value is smaller than the current dischargeable capacity value, it can be presumed that the electric vehicle 2 is charged by other charging equipment outside the home. In the present embodiment, this is used to determine whether the difference between the last dischargeable capacity value and the current dischargeable capacity value is the amount consumed by traveling or the amount of charge performed by other charging equipment.

When the last dischargeable capacity value saved in the database is larger than the current dischargeable capacity value (step S16: Yes), the display device 101 saves the current dischargeable capacity value, saves the difference between the dischargeable capacity values as an amount consumed by traveling (step S17), and terminates the process. Specifically, in step S17, the control unit 112 registers the vehicle identification number, the current time, and the vehicle connection state in the database in addition to the current dischargeable capacity value in a manner similar to step S2. Furthermore, in step S17, the control unit 112 stores the amount consumed by traveling in association with the vehicle identification number and the current time in the storage unit 115. For example, the amount consumed by traveling can also be registered in the database, and the control unit 112 registers the current time, the vehicle connection state, the dischargeable capacity value, and the amount consumed by traveling in entries associated with the vehicle identification number acquired in step S12 in the database in step S17.

When the last dischargeable capacity value saved in the database is smaller than the current dischargeable capacity value (step S16: No), the display device 101 saves the current dischargeable capacity value, also saves the difference between the dischargeable capacity values as the amount of charge performed by other charging equipment (step S18), and terminates the process. Specifically, in step S18, the vehicle identification number, the current time, and the vehicle connection state are registered in the database in addition to the current dischargeable capacity value, in a manner similar to step S2. Furthermore, in step S18, the control unit 112 stores the amount of charge performed by other charging equipment in association with the vehicle identification number and the current time in the storage unit 115. For example, the amount of charge performed by other charging equipment can also be registered in the database, and the control unit 112 registers the current time, the vehicle connection state, the dischargeable capacity value, and the amount of charge performed by other charging equipment in entries associated with the vehicle identification number acquired in step S12 in the database in step S18.

As described above, in the present embodiment, the control unit 112 manages the vehicle connection state, which is the connection state whether or not the electric vehicle 2 is connected with the charge and discharge cable 103. In a case where a vehicle identification number identical to the vehicle identification number acquired by the first communication unit 121 when the vehicle connection state has changed from not connected to connected is found among the vehicle identification numbers stored in the storage unit 115, the control unit 112 reads a first dischargeable capacity value, which is the latest dischargeable capacity value stored in association with the vehicle identification number in the storage unit 115. The control unit 112 calculates the difference between the first dischargeable capacity value and a second dischargeable capacity value, which is the latest dischargeable capacity value acquired by the first communication unit 121. The control unit 112 then calculates a first power amount, which is the amount of power used by traveling of the electric vehicle 2 associated with the vehicle identification number, or a second power amount, which is the amount of power with which the electric vehicle 2 associated with the vehicle identification number is charged by equipment other than the charge and discharge unit 122, on the basis of the calculated difference. The display unit 111 displays the first power amount when the first power amount is calculated, and displays the second power amount when the second power amount is calculated.

The processes described above enables the electric vehicle charging and discharging system 1*a* to manage not only the dischargeable capacity value but also the amount consumed by traveling and the amount of charge performed by other charging equipment for each vehicle identification number. Thus, the energy state of the electric vehicle 2 during a period in the non-connected state can be managed for each vehicle identification number. The display device 101 of the present embodiment records the dischargeable capacity value, the amount consumed by traveling, and the amount of charge performed by other charging equipment in association with time for each vehicle identification number, that is, for each electric vehicle 2 through the processes illustrated in FIGS. 6 and 7 described above. The display device 101 is thus capable of displaying the energy history for each vehicle identification number by using the recorded information. Specifically, the control unit 112 is capable of displaying variation with time of the dischargeable capacity value in the form of a graph on the display unit 111 by reading the time and the dischargeable capacity value for each vehicle identification number from the database. Thus, the display unit 111 is capable of displaying the dischargeable capacity value and the time stored in the storage unit 115 in association with each other for each vehicle identification number. Alternatively, the control unit 112 may also display other information such as the power amounts measured by the energy measurement unit 104 on the display unit 111. For example, the display unit 111 is can display at least one of the power amounts measured by the energy measurement unit 104 and stored in the storage unit 115 in association with time.

In addition, the control unit 112 is capable of displaying variation with time of the amount consumed by traveling in the form of a graph on the display unit 111 by reading the time and the amount consumed by traveling for each vehicle identification number from the database. In a similar manner, the control unit 112 is capable of displaying variation with time of the amount of charge performed by other charging equipment in the form of a graph on the display unit 111 by reading the time and the amount of charge performed by other charging equipment for each vehicle identification number from the database. As described above, however, the amount consumed by traveling and the amount of charge performed by other charging equipment are calculated at a point when the electric vehicle 2 is connected again with the electric vehicle charging and discharging system 1*a* after the electric vehicle 2 once connected with the electric vehicle charging and discharging system 1*a* was disconnected. Thus, the time at which the electric vehicle 2 is connected again, which is, however, different from the original charging or discharging time, can be regarded as the time of occurrence of the amount consumed by traveling and the amount of charge performed by other charging equipment. Note that, because there is an upper limit to the amount of charge per unit time regarding the amount of charge performed by other charging equipment, the amount of charge performed by other charging equipment may be displayed separately in a plurality of time zones on the basis of the upper limit. Alternatively, in a case where a user knows the variation with time of the amount of charge/discharge of the electric vehicle 2 while being in the non-connected state, the control unit 112 may receive an input from the user via the input unit 114 and correct the amount of charge/discharge of the electric vehicle 2 while being in the non-connected state. This correction will be described later.

Figure 8:
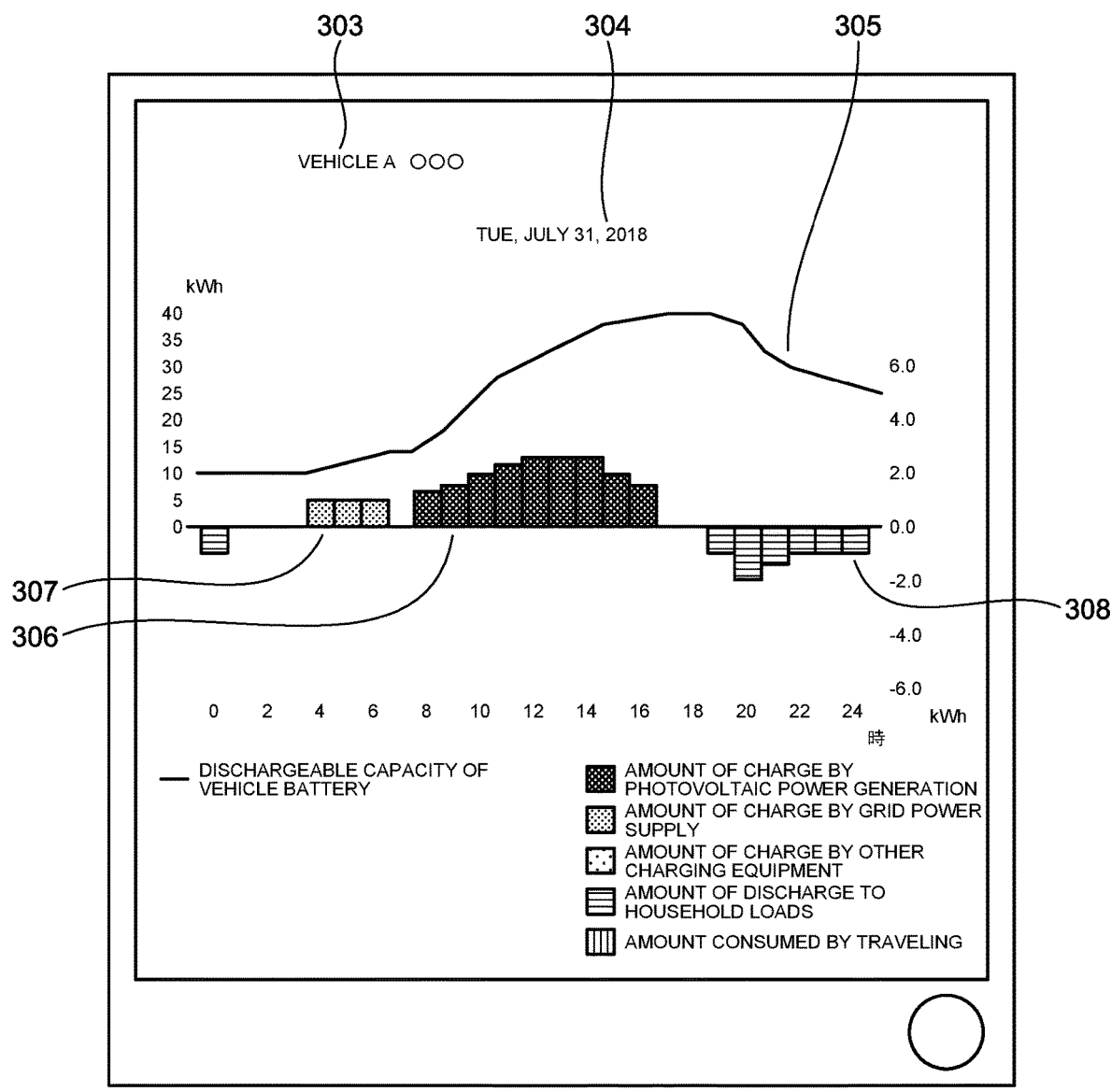
FIG. 8 is a diagram illustrating an example of a screen displayed by a display device in the second embodiment.

FIG. 8 is a diagram illustrating an example of a screen displayed by the display device 101 of the present embodiment. FIG. 8 illustrates an example of display of energy on a day when the electric vehicle 2 is connected with the electric vehicle charging and discharging system 1*a* all day. In the example illustrated in FIG. 8, the history of the dischargeable capacity value saved in the database and the power amounts measured by the energy measurement unit 104 are also displayed on the display unit 111. An area 304 is an area in which the date that is displayed is displayed. In the example illustrated in FIG. 8, information on Tuesday, Jul. 31, 2018, as described in the area 304, is displayed on the display unit 111. A line graph 305 represents the dischargeable capacity value at each time stored in the database for one day of Tuesday, Jul. 31, 2018, where the horizontal axis represents time and the vertical axis represents the dischargeable capacity value. The left end of the horizontal axis represents 0 o'clock, and the right end thereof represents 24 o'clock. The screen illustrated in FIG. 8 is displayed for each vehicle identification number. In the example illustrated in FIG. 8, an identification number of a vehicle having a vehicle name of VEHICLE A is displayed in the area 303.

In FIG. 8, a bar graph 306 represents "the amount of charge by photovoltaic power generation", which is the amount of power supplied from the PV power conditioner 9 and used for charging the electric vehicle 2, and a bar graph 307 represents "the amount of charge by the grid power supply", which is the amount of power supplied from the grid power supply 4 and used for charging the electric vehicle 2. In addition, a bar graph 308 represents "the discharge amount to household loads", which is the amount of power supplied from the electric vehicle and consumed by the household load 3. In the example illustrated in FIG. 8, power from the grid power supply 4 is stored in the battery for driving of the electric vehicle 2 from 4 o'clock to 6 o'clock at dawn, and surplus power after the solar photovoltaic panel 8 started to generate power is stored in the battery for driving of the electric vehicle 2. In addition, after 19 o'clock in the evening, power is discharged from the battery for driving of the electric vehicle 2 and used for the household load 3. In the example illustrated in FIG. 8, such energy usage of a day is displayed with the line graph 305 of the dischargeable remaining capacity value.

Figure 9:
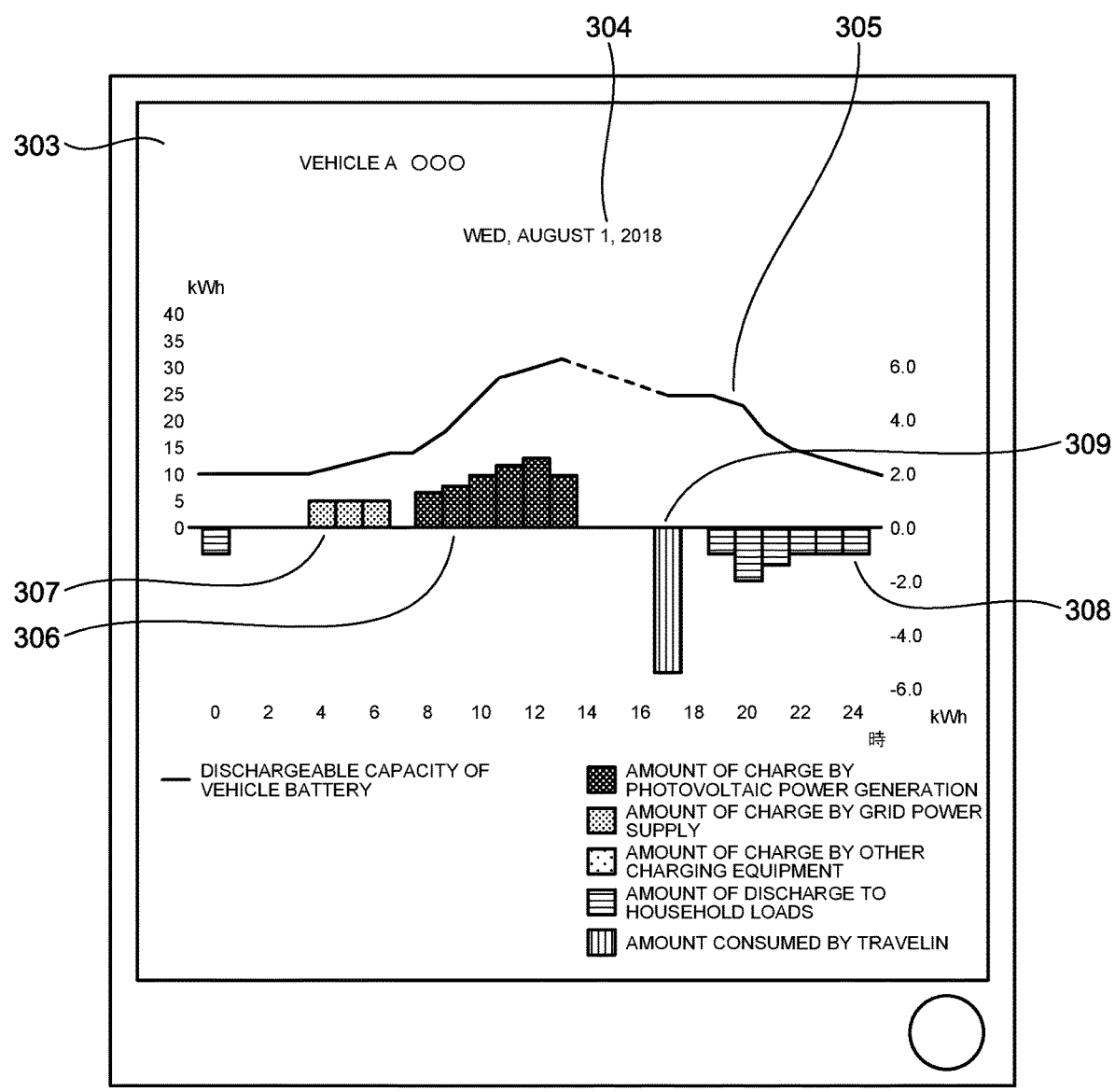
FIG. 9 is a diagram illustrating an example of a screen displayed by the display device in the second embodiment.

FIG. 9 is a diagram illustrating an example of a screen displayed by the display device 101 of the present embodiment. FIG. 9 illustrates an example of energy display on a day including a time zone during which the electric vehicle 2 traveled. The definitions of the area 304, the line graph 305, and the bar graphs 306 to 308 are similar to those in FIG. 8. Note that the solid line of the line graph 305 represents the dischargeable remaining capacity value acquired from the electric vehicle 2 the connection state is the connected state. The broken line of the line graph 305 is a part where the vehicle connection state is the non-connected state and the dischargeable remaining capacity value is unknown.

In the example illustrated in FIG. 9, the electric vehicle 2 is connected with the electric vehicle charging and discharging system 1a from 0 o'clock to 13 o'clock, and the electric vehicle 2 is not connected with the electric vehicle charging and discharging system 1a from 13 o'clock to 17 o'clock. In addition, as described above, the display device 101 can detect a change in the dischargeable remaining capacity value during the period in the non-connected state by obtaining the difference between the dischargeable remaining capacity value of the battery for driving at 13 o'clock and the dischargeable remaining capacity value of the battery for driving at 17 o'clock of the electric vehicle 2. In the example illustrated in FIG. 9, the dischargeable remaining capacity value of the battery for driving at 17 o'clock is reduced from the dischargeable remaining capacity value of the battery for driving at 13 o'clock, and the display device 101 thus determines that the difference is due to the amount consumed by traveling, and displays the amount consumed by traveling in the form of a bar graph 309.

Figure 10:
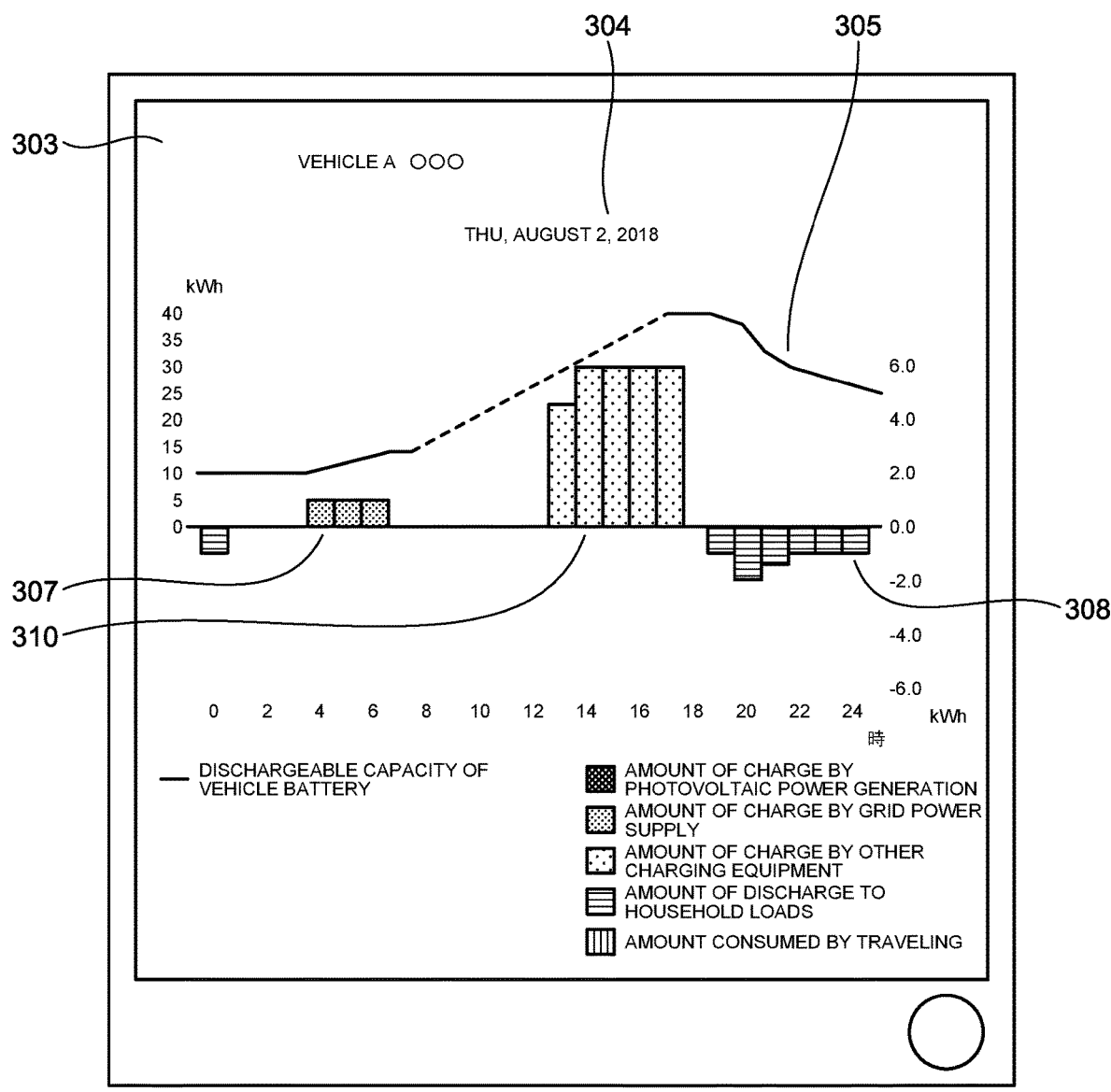
FIG. 10 is a diagram illustrating an example of a screen displayed by the display device in the second embodiment.

FIG. 10 is a diagram illustrating an example of a screen displayed by the display device 101 of the present embodiment. FIG. 10 illustrates an example of display of energy on a day including a time zone during which the electric vehicle 2 is charged outside the home. The definitions of the area 304, the line graph 305, and the bar graphs 307 and 308 are similar to those in FIG. 9. In the example illustrated in FIG. 10, the electric vehicle 2 is connected with the electric vehicle charging and discharging system 1a from 0 o'clock to 8 o'clock, and the electric vehicle 2 is not connected with the electric vehicle charging and discharging system 1a from 8 o'clock to 17 o'clock. In the example illustrated in FIG. 10, the dischargeable remaining capacity value of the battery for driving at 17 o'clock is increased from the dischargeable remaining capacity value of the battery for driving at 8 o'clock, and the display device 101 thus determines that the difference is due to the amount of charge performed by other charging equipment, and displays the amount of charge performed by other charging equipment in the form of a bar graph 310. In the example illustrated in FIG. 10, the amount of charge performed by other charging equipment is displayed separately in a plurality of time zones on the basis of the upper limit of the amount of charge per unit time.

Figure 11:
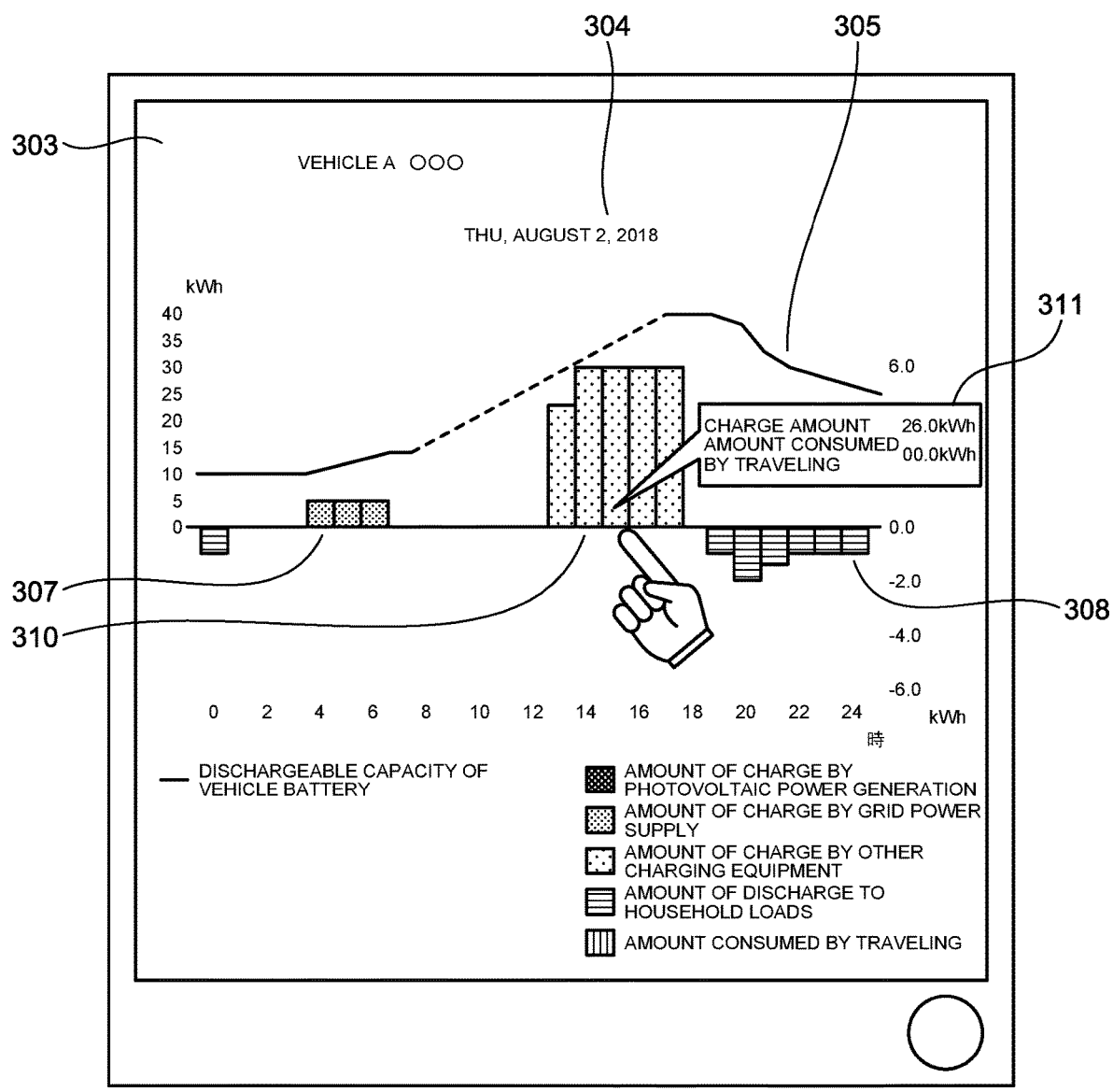
FIG. 11 is a diagram illustrating an example of a screen for receiving a change in information displayed on the screen illustrated in FIG. 10.

FIG. 11 is a diagram illustrating an example of a screen for receiving a change in information displayed on the screen illustrated in FIG. 10. In the example illustrated in FIG. 11, the control unit 112 receives a change in at least part of the information displayed on the screen illustrated in FIG. 10 via the input unit 114. When a user selects the bar graph 310 representing the power amount during a time zone from 8 o'clock to 17 o'clock when the electric vehicle 2 is not connected with the electric vehicle charging and discharging system 1a by operating the input unit 114, the control unit 112 displays an input area 311 in which details of the amount of charge performed by other charging equipment and the amount consumed by traveling can be input on the display unit 111 as illustrated in FIG. 11. As illustrated in FIG. 11, a user can select a value of the bar graph 310 in each time zone. In FIG. 11, a text of "CHARGE AMOUNT" indicating the amount of charge performed by other charging equipment and a text of "AMOUNT CONSUMED BY TRAVELING" indicating the amount consumed by traveling are displayed in the input area 311, and the numerical values on the right of the respective texts can be changed by operation using the input unit 114. In this manner, in the example illustrated in FIG. 11, the charge/discharge amount of the electric vehicle 2 during the non-connected state can be corrected by an input from a user.

Note that the method by which the input from a user is received is not limited to the example in FIG. 11, and an operation of an increase or a decrease in a numerical value may be received. In addition, while the display device 101 displays the input area 311 for the input in such a manner that the input area 311 is superimposed on the screen illustrated in FIG. 10 in the example illustrated in FIG. 11, the screen for the input may be displayed as a screen separate from the screen in FIG. 10, and the method for receiving the input is not limited. Upon receiving a change in a value made by a user, the display device 101 reflects the change in the value in the database. For example, assume that the electric vehicle 2 is not connected with the electric vehicle charging and discharging system 1a from 8 o'clock to 17 o'clock, that traveling and charging by other charging equipment are both performed by the electric vehicle 2 from 12 o'clock to 13 o'clock, and that charging by other charging equipment is performed from 13 o'clock to 17 o'clock. In this case, the dischargeable remaining capacity value is reduced from the last dischargeable remaining capacity value over the period in the non-connected state, and the display device 101 can thus recognize that charging by other charging equipment is performed but cannot recognize that traveling is performed. In this manner, when traveling and charging by other charging equipment are both performed, reception of correction as described above made by a user enables more correct energy display.

While the control unit 112 of the display device 101 calculates the amount consumed by traveling and the amount of charge performed by other charging equipment in the present embodiment, the control unit 123 of the electric vehicle charger and discharger 102 may alternatively acquire necessary information from the database via the communication units and calculate the amount consumed by traveling and the amount of charge performed by other charging equipment. In addition, a database may be provided in the electric vehicle charger and discharger 102.

As described above, in the present embodiment, the dischargeable remaining capacity value is saved for each vehicle identification number, and when the electric vehicle 2 that was connected with electric vehicle charging and discharging system 1a is once disconnected and is then connected again with electric vehicle charging and discharging system 1a, the energy state of the electric vehicle 2 during the period in the non-connected state is obtained with use of a newly acquired dischargeable remaining capacity value and the saved dischargeable remaining capacity value. This produces effects similar to those in the first embodiment, and enables display of energy usage of an electric vehicle in more detail than in the first embodiment. In addition, in the present embodiment, the display device 101 measures the amounts of power supplied and received through respective paths in the home by the energy measurement unit 104, and also displays the amounts of power measured by the energy measurement unit 104 together with the dischargeable remaining capacity value. This enables a user to know the overall energy use of the home.

Third Embodiment

Figure 12:
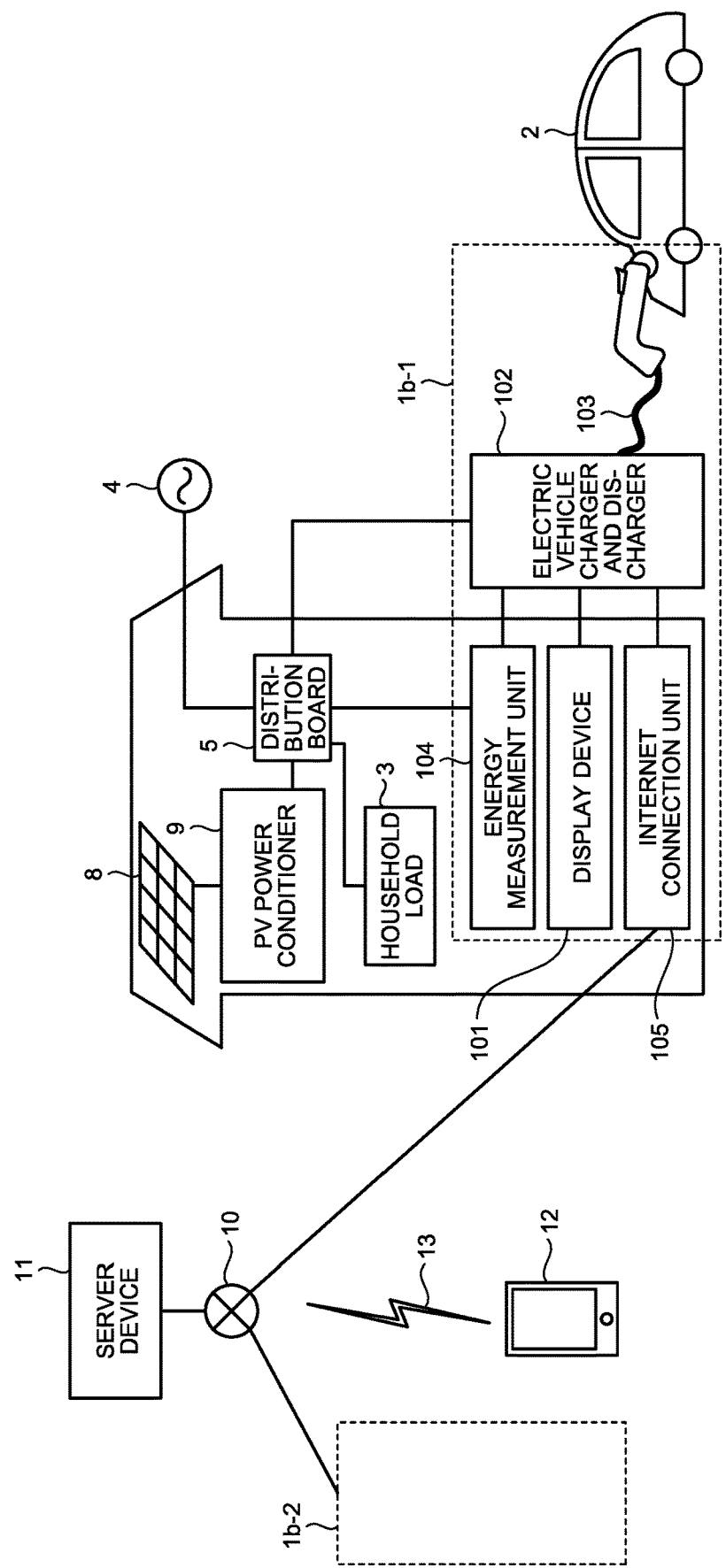
FIG. 12 is a diagram illustrating an example of a configuration of an electric vehicle charging and discharging system according to a third embodiment.

FIG. 12 is a diagram illustrating an example of a configuration of an electric vehicle charging and discharging system according to a third embodiment of the present invention. An electric vehicle charging and discharging system 1b-1 illustrated in FIG. 12 corresponds to the electric vehicle charging and discharging system 1a of the second embodiment additionally including an Internet connection unit 105. The charge and discharge cable 103 is similar to that in the first embodiment. The energy measurement unit 104 is similar to that in the second embodiment. The operations of the display device 101 and the electric vehicle charger and discharger 102 are partially different from those in the first embodiment, but the configurations of the display device 101 and the electric vehicle charger and discharger 102 are similar to those in the first embodiment, and the description of the configurations of the display device 101 and the electric vehicle charger and discharger 102 will thus not be repeated. Differences from the first embodiment and the second embodiment will be mainly described below.

The Internet connection unit 105, which is a connection unit, can be connected with a server device 11 via the Internet 10, which is a wide area network. In addition, an electric vehicle charging and discharging system 1b-2 similar to the electric vehicle charging and discharging system 1b-1 can also be connected with the server device 11. While two electric vehicle charging and discharging systems are illustrated in FIG. 12, three or more similar electric vehicle charging and discharging systems may be capable of being connected with the server device 11 via the Internet 10. In addition, a terminal device 12 such as a smart phone or a tablet can also be connected with the server device 11 via a public network 13 and the Internet 10. Note that, in the present embodiment, at least one of the terminal device 12 and the server device 11 may be a component of the energy display system in addition to the electric vehicle charging and discharging system 1b-1.

While the electric vehicle charging and discharging system 1a saves the vehicle identification number, the dischargeable capacity value, etc. acquired from the connected electric vehicle 2 in the display device 101 in the second embodiment, the electric vehicle charging and discharging system 1b-1 transmits the vehicle identification number, the dischargeable capacity, etc. acquired from the electric vehicle 2 to the server device 11 together with the current time in the present embodiment. In this process, the identification information of the electric vehicle charging and discharging system 1b-1 is also transmitted to the server device 11. The server device 11 saves the received information for each vehicle identification number.

Figure 13:
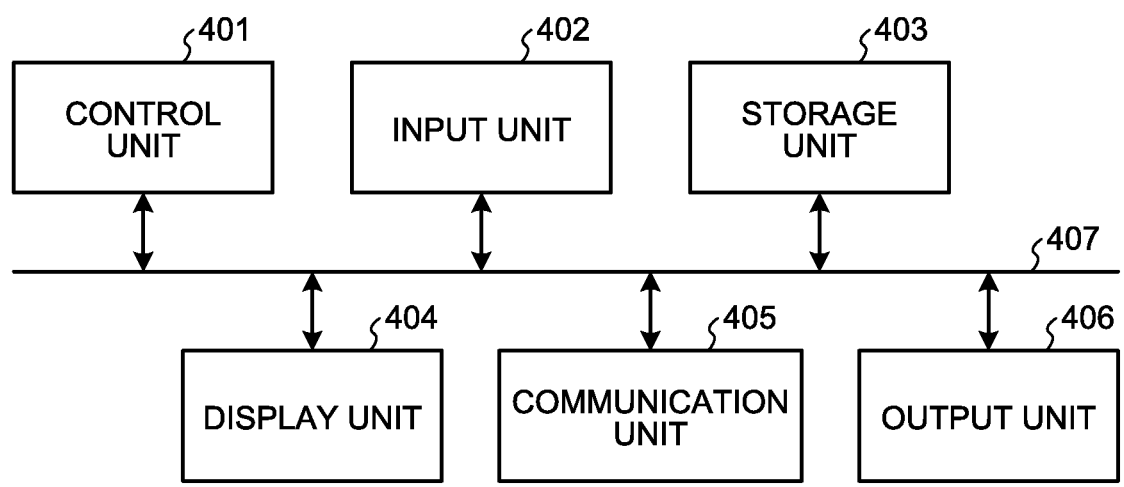
FIG. 13 is a diagram illustrating an example of a configuration of a server device according to the third embodiment.

FIG. 13 is a diagram illustrating an example of a configuration of the server device 11 according to the present embodiment. The server device 11 is a computer system that includes a control unit 401, an input unit 402, a storage unit 403, a display unit 404, a communication unit 405, and an output unit 406, which are connected with each other via a system bus 407.

In FIG. 13, the control unit 401 is a processor such as a central processing unit (CPU), for example. The control unit 401 performs the operation as the server device 11 by executing programs describing processes of the server device 11 of the present embodiment. The input unit 402 is constituted by a keyboard, a mouse, and the like, and used by a user of the computer system to input various information. The storage unit 403 includes various memories such as a random access memory (RAM) and a read only memory (ROM) and a storage device such as a hard disk, and stores the programs to be executed by the control unit 401, necessary data acquired during the processes, and the like. The storage unit 403 is also used as a temporary storage area for the programs.

The display unit 404 is constituted by a liquid crystal display (LCD) panel, or the like, and displays various screens for a user of the computer system. The communication unit 405 is a communication circuit that performs communication processes, or the like. The communication unit 405 may be constituted by a plurality of communication circuits compliant with a plurality of communication methods, respectively. The output unit 406 is an output interface that outputs data to an external device such as a printer or an external storage device. The input unit 402, the display unit 404, and the output unit 406 are not essential for the server device 11 of the present embodiment, and the server device 11 may not include one or more of the input unit 402, the display unit 404, and the output unit 406. Note that FIG. 13 is one example, and the configuration of the server device 11 is not limited to the example of FIG. 13.

The storage unit 403 of the server device 11 is provided with a wide area database that is a database for storing information on the electric vehicle 2 received from a plurality of electric vehicle charging and discharging systems including the electric vehicle charging and discharging system 1b-1. The server device 11 registers, in the wide area database, the vehicle identification number of the electric vehicle 2, the time, the dischargeable capacity, and the like received from the electric vehicle charging and discharging system 1b-1 via the Internet 10 via the communication unit 405. In the wide area database, data are managed for each vehicle identification number, and data received from different electric vehicle charging and discharging systems but associated with the same vehicle identification number are managed in an integrated manner. This enables the server device 11 to manage data acquired from the electric vehicle 2 as data of the same vehicle, even when the electric vehicle 2 moved and was connected with different electric vehicle charging and discharging systems.

For example, assume that the electric vehicle 2 disconnects from the electric vehicle charging and discharging system 1b-1 after being charged or discharged by the electric vehicle charging and discharging system 1b-1, moves to another location and then connects with an electric vehicle charging and discharging system 1b-2. In this case, the electric vehicle charging and discharging system 1b-2 can acquire the vehicle identification number, the current dischargeable capacity value, and the like of the electric vehicle 2 from the electric vehicle 2. Furthermore, in the electric vehicle charging and discharging system 1b-2, the control unit 123 of the electric vehicle charger and discharger 102 acquires the time, the dischargeable capacity value, and the like associated with the vehicle identification number acquired from the electric vehicle 2 from the server device 11 via the Internet connection unit 105 and the Internet 10. The control unit 123 then transmits the information acquired from the server device 11 to the display device 101. In the display device 101, the information acquired from the server device 11 via the electric vehicle charger and discharger 102 are stored for each vehicle identification number in the database of the storage unit 115 in a manner similar to the second embodiment.

While an example in which the electric vehicle charger and discharger 102 is connected with the Internet connection unit 105 is presented in the present embodiment, the display device 101 may be connected with the Internet connection unit 105 and the control unit 112 may acquire information from the server device 11 via the Internet connection unit 105.

The processes described above enable the display device 101 to also display, for each vehicle identification number, the dischargeable capacity value and the like of the electric vehicle 2 acquired when the electric vehicle 2 is connected with another electric vehicle charging and discharging system on the display unit 111. In this case, the dischargeable capacity value obtained while the electric vehicle 2 was connected with another electric vehicle charging and discharging system can be displayed with a different line type or in a different color, which enables the user to easily know the state of the electric vehicle 2. As a result, in a case where a plurality of electric vehicle charging and discharging systems are installed in one town or one facility, for example, information acquired from the electric vehicle charging and discharging systems can be managed in an integrated manner.

In addition, the terminal device 12 can display the dischargeable capacity value and the like in a manner similar to the display device 101 by specifying the vehicle identification number and acquiring information relating to the vehicle identification number from the server device 11. The terminal device 12 has a configuration similar to that of the display device 101, for example. This enables a user to check the energy usage of each electric vehicle 2 even from outside the home.

In addition, the terminal device 12 acquires information from the server device 11 and displays the information, which enables the owner of the electric vehicle 2 to check the energy usage even when the electric vehicle 2 is not connected with the electric vehicle charging and discharging system 1b-1 installed in the owner's home. In addition, even when the electric vehicle 2 is outside the owner's home, if the electric vehicle 2 is connected with an electric vehicle charging and discharging system similar to the electric vehicle charging and discharging system 1b-1 at a different location, the owner can also check the location to which the electric vehicle 2 moved on the basis of the identification information of the electric vehicle charging and discharging system acquired from the server device 11.

The configurations presented in the embodiments above are examples of the present invention, and can be combined with other known technologies or can be partly omitted or modified without departing from the scope of the present invention.

REFERENCE SIGNS LIST 1, 1a, 1b-1, 1b-2 electric vehicle charging and discharging system; 2 electric vehicle; 3 household load; 4 grid power supply; 5 distribution board; 10 Internet; 11 server device; 12 terminal device; 101 display device; 102 electric vehicle charger and discharger; 103 charge and discharge cable; 104 energy measurement unit; 105 Internet connection unit; 111 display unit; 112, 123 control unit; 113 communication unit; 114 input unit; 115 storage unit; 121 first communication unit; 122 charge and discharge unit; 124 second communication unit.

The invention claimed is:

1. An energy display system comprising:
charge and discharge circuitry configured to charge and discharge a battery mounted on one of one or more movable electric vehicles;
acquisition circuitry configured to acquire a vehicle identification number, a dischargeable capacity value, and a maximum capacity value from the electric vehicle when the electric vehicle is connected with the charge and discharge circuitry, the dischargeable capacity value indicating a dischargeable amount of power of the battery and the maximum capacity value indicating a maximum capacity to which the battery can be charged;
a charge and discharge cable connected with the charge and discharge circuitry and capable of being connected with the electric vehicle;
a display device;
storage circuitry; and
control circuitry configured to
manage a vehicle connection state indicating whether or not an electric vehicle is connected with the charge and discharge cable,
acquire, using the acquisition circuitry, a vehicle identification number and a dischargeable capacity value from a connected electrical vehicle,
store the vehicle identification number, the dischargeable capacity value, and a time in which the vehicle identification number and dischargeable capacity value are acquired in the storage circuitry,
calculate, when a vehicle connection state of an electrical vehicle corresponding to the vehicle identification numbers stored in the storage circuitry changes from a non-connected state to a connected state, a first power amount or a second power amount on the basis of a difference between a first dischargeable capacity value and a second dischargeable capacity value, where the first power amount is an amount of power used by traveling of the electric vehicle associated with the vehicle identification number, the second power amount is an amount of power with which the electric vehicle associated with the vehicle identification number is charged by equipment other than the charge and discharge circuitry, the first dischargeable capacity value is a latest dischargeable capacity value stored in the storage circuitry in association with the vehicle identification number, the second dischargeable capacity value being a latest dischargeable capacity value acquired by the acquisition circuitry, and
control the display device to display the acquired vehicle identification number, the acquired dischargeable capacity value, the acquired maximum capacity value, and the first or second calculated power amount, where the acquired dischargeable capacity value is displayed along with and the time acquired for each vehicle identification number stored in the storage circuitry.

2. The energy display system according to claim 1, further comprising:
energy measurement circuitry configured to determine an amount of power generated by a photovoltaic power generation system, an amount of power consumed by a household load, an amount of power supplied from a grid power supply, and an amount of power caused to flow reversely to the grid power supply, wherein
the control circuitry is further configured to
store the amounts of powers determined by the energy measurement circuitry along with a current time in the storage circuitry, and
control the display device to display at least one of the determined amounts of power stored in the storage circuitry along with the time at which the amounts where determined.

3. The energy display system according to claim 1, wherein the control circuitry determines the difference to be the first power amount when the first dischargeable capacity value is larger than the second dischargeable capacity value.

4. The energy display system according to claim 1, wherein the control circuitry determines the difference to be the second power amount when the first dischargeable capacity value is smaller than the second dischargeable capacity value.

5. The energy display system according to claim 1, further comprising:
a receiver to receive an input from a user, wherein
the first power amount and the second power amount are changeable by the input to the receiver.

6. The energy display system according to claim 1, further comprising:
a connector capable of being connected with a wide area network to transmit the vehicle identification number, the time, and the dischargeable capacity value to a server device capable of being connected with a plurality of energy display systems via the wide area network, wherein
the display displays the time and the dischargeable capacity value acquired from the server device via the connection circuitry for each vehicle identification number.

7. The energy display system according to claim 6, further comprising:
a terminal capable of being connected with a wide area network, wherein
the terminal acquires the vehicle identification number and the dischargeable capacity value from the server device via the wide area network, and displays the vehicle identification number and the dischargeable capacity value.

8. An energy display method for an electric vehicle charging and discharging system including a charge and discharge circuitry capable of charging a battery mounted on one of one or more movable electric vehicles and discharging the battery, the energy display method comprising:
managing a vehicle connection state indicating whether or not an electric vehicle is connected with the charge and discharge cable;
acquiring, by the electric vehicle charging and discharging system, a vehicle identification number of the electric vehicle and a dischargeable capacity value from the electric vehicle when the electric vehicle is connected with the charge and discharge circuitry, the dischargeable capacity value indicating a dischargeable amount of power of the battery;
storing, by the electric vehicle charging and discharging system, a vehicle identification number, the dischargeable capacity value, and a time in which the vehicle identification number and dischargeable capacity value are acquired in a storage circuitry;
calculating, when a vehicle connection state of an electrical vehicle corresponding to the vehicle identification numbers stored in the storage circuitry changes from a non-connected state to a connected state, a first power amount or a second power amount on the basis of a difference between a first dischargeable capacity value and a second dischargeable capacity value, where the first power amount is an amount of power used by traveling of the electric vehicle associated with the vehicle identification number, the second power amount is an amount of power with which the electric vehicle associated with the vehicle identification number is charged by equipment other than the charge and discharge circuitry, the first dischargeable capacity value is a latest dischargeable capacity value stored in the storage circuitry in association with the vehicle identification number, the second dischargeable capacity value being a latest dischargeable capacity value acquired by the acquisition circuitry; and
displaying, by the electric vehicle charging and discharging system, the acquired vehicle identification number, the acquired dischargeable capacity value, and the first or second calculated power amount, where the dischargeable capacity value is displayed along with the time acquired for each vehicle identification number stored in the storing circuitry.

* * * * *